(12) United States Patent
Dabak et al.

(10) Patent No.: US 6,798,737 B1
(45) Date of Patent: Sep. 28, 2004

(54) USE OF WALSH-HADAMARD TRANSFORM FOR FORWARD LINK MULTIUSER DETECTION IN CDMA SYSTEMS

(75) Inventors: Anand G. Dabak, Richardson, TX (US); Srinath Hosur, Dallas, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/413,314

(22) Filed: Oct. 6, 1999

(51) Int. Cl.[7] ............................. H04J 11/00; H04B 1/10
(52) U.S. Cl. ....................... 370/209; 375/148; 375/349
(58) Field of Search ............................. 370/208, 209, 370/335, 342, 441, 479, 320, 321; 375/130, 140, 147, 148, 149, 151, 254, 144, 349, 285, 346, 347, 267; 455/132, 137, 138, 139; 708/820, 821, 400, 404, 405, 410

(56) References Cited

U.S. PATENT DOCUMENTS

| | | | |
|---|---|---|---|
| 3,815,124 A | * 6/1974 | Brewer | 341/160 |
| 4,291,299 A | * 9/1981 | Hinz et al. | 341/123 |
| 5,315,301 A | * 5/1994 | Hosotani et al. | 341/94 |
| 5,489,905 A | * 2/1996 | Gross et al. | 341/160 |
| 5,644,312 A | * 7/1997 | Deevy et al. | 341/160 |
| 5,793,814 A | * 8/1998 | Baier et al. | 375/285 |
| 5,926,503 A | * 7/1999 | Kelton et al. | 375/148 |
| 5,930,288 A | * 7/1999 | Eberhardt | 375/148 |
| 6,067,292 A | * 5/2000 | Huang et al. | 370/342 |
| 6,097,712 A | * 8/2000 | Secord et al. | 370/335 |
| 6,154,487 A | * 11/2000 | Murai et al. | 375/150 |
| 6,175,588 B1 | * 1/2001 | Visotsky et al. | 375/148 |
| 6,269,075 B1 | * 7/2001 | Tran | 370/206 |
| 6,347,234 B1 | * 2/2002 | Scherzer | 455/562 |

FOREIGN PATENT DOCUMENTS

| | | |
|---|---|---|
| WO | WO 07/08846 | 6/1997 |
| WO | WO 98/43362 | 1/1998 |

OTHER PUBLICATIONS

XS 9920327210 MA, Abstract, 1page.
"High–Speed Data Transmission with Multicode Modulation and Turbo–codes for Wireless Personal Communications", IEEE International Conference on Communications (ICC), P. Kuganesan et al., Aug. 6, 1997, pp. 959–968.

* cited by examiner

*Primary Examiner*—Douglas Olms
*Assistant Examiner*—Van Nguyen
(74) *Attorney, Agent, or Firm*—Carlton H. Hoel; W. James Brady; Frederick J. Telecky, Jr.

(57) ABSTRACT

A station capable of receiving information containing Walsh coding for a plurality of channels and canceling interference from the received information and the method of cancellation. A memory is provided for storing received signals containing a Walsh code for each of a plurality of channels as well as reflected and/or refracted versions of said received signals and a first plurality of signal paths is provided which are selectively coupled to the memory. The signal paths apply corresponding delays and inverse Walsh code transformations to separate the channels. Further, cancellation of the channels interfering with a desired channel proceeds with complementary delays and Walsh code transformation to regenerate the interference which is subtracted from the received signal in memory.

16 Claims, 3 Drawing Sheets

USE OF WALSH-HADAMARD TRANSFORM FOR FORWARD LINK MULTIUSER DETECTION IN CDMA SYSTEMS

BACKGROUND OF THE INVENTION

1. Field of the Invention

This invention relates to a method for interference cancellation in CDMA systems, particularly in conjunction with such system having plural mobile stations.

2. Brief Description of the Prior Art

Code division multiple access (CDMA) communication systems are communication systems wherein data is transmitted in accordance with a particular code whereas in time division and frequency division systems the transmission is based upon allocated time slots for transmission and reception and difference in frequency band of the communication, respectively. In CDMA, all frequencies and all time slots are available whereby communication with a particular receiver is provided by matching a code applied to the message being sent with the code of the selected receiver. The selected receiver receives only those communication wherein transmitted code and receiver code match. In such CDMA systems, the codes of all receivers in the system must be orthogonal to the other receivers in the system in order to avoid distortion due to cross talk and the like.

A problem arises during transmission from the base station to the mobile receivers in that, though the signals being transmitted to different mobile receivers in the system may initially be orthogonal to each other as required, the transmitted signal may be reflected and/or refracted one or more times, such as from buildings in the transmission path and/or other reflecting and/or refracting media. These reflections and/or refractions cause the originally orthogonal signals to shift so that they are no longer completely orthogonal and are received by other receivers with varying degrees of magnitude, thereby causing interference in the other receivers. The quality of the received signal is a function of the amplitude of the transmitted signal divided by a function of the noise plus the interference. Since the noise is generally not changeable in established equipment, minimization of the interference is desirable and generally essential for signal quality improvement and is therefore the apparent approach required to improve received signal quality. Current commercial CDMA systems do not have a mechanism for cancellation of such types of interference.

Interference cancellation in CDMA systems has been studied extensively as a way to increase capacity, decrease the requirements for power control or improve the bit error rate at the receiver and is of particular interest with reference to wideband code division multiple access (WCDMA) systems. One type of interference cancellation is multiuser detection where the receiver demodulates the information from many different transmitters. This cancellation usually occurs at the base station which must receive signals from all of the mobile units within its cell, but such cancellation can also be provided at the mobile unit as well. The optimal interference cancellation method is presented by S. Verdu, "Minimum probability of error for asynchronous Gaussian multiple-access channels," IEEE Transactions on Information Theory, vol. IT-32, No. 1, pp. 85–96, January 1986. This procedure can be used to find an upper bound on the performance gain that can be achieved through interference cancellation. The optimal interference cancellation has been shown to involve maximum likelihood sequence estimation (MLSE), however, MLSE has a complexity which is exponential with the number of users, making this solution uneconomical and unimplementable in a cost and power-efficient manner. Interference cancellation can be used at the base station to cancel the effect of other mobile units in a single cell and it can be used at the mobile station to cancel out the interfering signals from the current base station or other base stations.

It should be understood that the term "receiver" as used herein refers both to an instrument capable of reception only as well as an instrument capable of transmission and reception, the "receiver" generally being mobile.

SUMMARY OF THE INVENTION

In accordance with the present invention, there is provided a multi-stage system for cancellation of the above-described interference which is generally simple and relatively inexpensive. The invention described herein is used at the mobile station to cancel interference from the base station caused by multipath, the case wherein the received signal arrives as transmitted as well as in reflected and/or refracted state. The approach taken relates to multi-user detection (MUD), which is a type of interference cancellation in which the signals on many channels are demodulated at the receiver. In this context, MUD refers to the demodulation of many channels transmitted by one base station.

Briefly, there is provided a mobile station with multiple RAKE fingers for receiving a signal having a Walsh code. Each RAKE finger is a correlator which demodulates one multipath component of the received signal. (The basis vectors of the Hadamard transform can be generated by sampling Walsh functions which take only binary values ±1 and form a complete orthogonal basis for square integrable functions. The Hadamard transform is also known as the Walsh-Hadamard transform as explained in Jain, A. K., Fundamentals of Digital Image Processing, Prentice-Hall (1989).) After performing the standard procedure of removing the long code used by CDMA systems (the long code is a well known pseudo-random sequence taking binary values ±1 which modulates the transmitted signal to make it appear as Gaussian noise to other users in the system), the mobile station applies this signal to an inverse Walsh transform circuit (IFWT) to remove the appropriate Walsh code from each channel. This permits all of the channels transmitted by a base station to be demodulated simultaneously and provides a separate output for each channel. For each RAKE finger, a single channel response is estimated from the pilot symbols (training symbols which are known at the receiver and can be used for such purposes as synchronization, channel estimation and signal-to-interference ratio estimation) in each of the channels. The channel estimate averages the received pilot symbols to estimate the amplitude and phase of the channel. The output of each IFWT is multiplied by the complex conjugate of the channel response, and after maximal-ratio combining, each of the outputs is transferred to data decision blocks (estimate which symbol was transmitted by finding the closest constellation point to the received signal. For example, with QPSK modulation and a constellation of $\{1+j, 1-j, -1+j, -1-j\}$, if the received symbol is $0.8+1.1j$, then the data decision block will decide $1+j$ was sent) which make symbol decisions for each of the channels and are estimates of the transmitted data.

Interference cancellation is performed by transferring the estimated data for each channel to a Walsh transform circuit where the estimated data is respread into orthogonal channels using the Walsh code for each channel. This signal is multiplied by the downlink long code. For each RAKE finger, this regenerated signal is multiplied by the estimate of the channel response and is delayed by the channel delay of each finger. For each RAKE finger, the regenerated signal from all of the other fingers is subtracted from the original signal received by that finger. The original signal minus the regenerated interference is then fed back to the RAKE fingers where the signal is again recirculated through the above described circuitry as many times as desired, each recirculation removing additional interference. After the desired number of iterations, the estimated data from the last iteration for the channel(s) assigned to the mobile device is taken as the output of the receiver.

A standard implementation of the despreading and respreading operations at the receiver for M channels, each channel with a spreading factor of N, would require MN operations. The despreading and respreading operations are the most computationally intensive parts of the interference canceller, so a reduction in complexity of these operations allows the interference canceller to be implemented in a cost and power-efficient manner. This invention uses the Inverse Fast Walsh Transform (IFWT) and the Fast Walsh Transform (FWT) to reduce the computational requirements at the receiver. Since all of the received channels are synchronized in time and experience the same multipath, the Inverse Fast Walsh Transform (IFWT) can be used for despreading the Walsh code and the Fast Walsh Transform (FWT) can be used for respreading the Walsh codes. Both of these transforms can be implemented in $N \log_2(N)$ additions and subtractions. A second contribution of this invention is that channels with multiple rates can be despread and respread using a modified FWT. The number of operations required remains $N \log_2(N)$ or fewer. The multi-rate FWT is discussed hereinbelow.

When demodulating multiple channels, each of which has a different Walsh code, the IFWT can be used to remove the Walsh codes from each channel. The IFWT can be implemented in $N \log_2(N)$ additions and subtractions, where N is the length of the spreading sequence. For a 256 chip sequence, the number of operation required for different spreading factors is shown in the following table:

| N | OPERATIONS/ SYMBOL | SYMBOLS IN 256 CHIPS | TOTAL OPERATIONS |
|---|---|---|---|
| 4 | 8 | 64 | 512 |
| 8 | 24 | 32 | 768 |
| 16 | 64 | 16 | 1024 |
| 32 | 160 | 8 | 1280 |
| 64 | 384 | 4 | 1536 |
| 128 | 896 | 2 | 1792 |
| 256 | 2048 | 1 | 2048 |

If all of the channels to be detected have the same spreading factor N, then the IFWT with the correct spreading factor can be used to separate all of the channels. However, if the channels have multiple rates, and thus different spreading factors, then the number of operations will go up if a straigthforward implementation is used. For example, if spreading factors of 32 and 128 are present in some of the received channels, then a straightforward approach of applying IFWTs with lengths of 32 and 128 will require 1280+1792=3072 operations to process 256 chips.

The mobile station can respread the demodulated data into orthogonal channels using the FWT. The FWT also has a complexity of $N \log_2(N)$. FIGS. 1 and 2 show one version of the circuit diagrams for the FWT and IFWT, respectively, for Walsh codes of length 8. These flow graphs are not the conventional flow graphs for the FWT and IFWT, but are chosen to make multi-rate FWTs simple to implement. All signals travel from left to right and all operations are either additions or subtractions. The two branches intersecting at a node represent addition, except when the lower branch is marked with "−1" which represents subtraction at that node. The lower case letters denote the complex values before Walsh spreading, and the uppercase letters denote the complex values after Walsh spreading. The Walsh codes used are the standard such codes and the eight Walsh codes represented in FIGS. 1 and 2 are provided hereinbelow wherein each row represent one Walsh code and the lower case symbol to the left of each code is the data point assigned to the Walsh code:

| | | | | | | | | | |
|---|---|---|---|---|---|---|---|---|---|
| x0 | [ | 1 | 1 | 1 | 1 | 1 | 1 | 1 | 1] |
| x1 | [ | 1 | 1 | 1 | 1 | −1 | −1 | −1 | −1] |
| x2 | [ | 1 | 1 | −1 | −1 | 1 | 1 | −1 | −1] |
| x3 | [ | 1 | 1 | −1 | −1 | −1 | −1 | 1 | 1] |
| x4 | [ | 1 | −1 | 1 | −1 | 1 | −1 | 1 | −1] |
| x5 | [ | 1 | −1 | 1 | −1 | −1 | 1 | −1 | 1] |
| x6 | [ | 1 | −1 | −1 | 1 | 1 | −1 | −1 | 1] |
| x7 | [ | 1 | −1 | −1 | 1 | −1 | 1 | 1 | −1] |

It is easy to extend the single rate FWT and IFWT shown in FIGS. 1 and 2 to multi-rate versions. FIGS. 3 and 4 show examples of an 8-point Multi-Rate Fast Walsh Transform (MFWT) and an 8-point Inverse Multi-Rate Fast Walsh Transform (IMFWT). If a pair of data points has a spreading factor one half of the maximum spreading length, then the first butterfly is omitted. Similarly, if four data points have a spreading factor one fourth of the maximum spreading length, then the first two butterflies are omitted, This concept is extended to shorter spreading codes. The Walsh codes represented in the above examples are of lengths 2, 4 and 8 and are provided hereinbelow. Both x2 and x3 use the same Walsh code of length 4. The first four chips transmit x2 and the second 4 chips transmit x3. Similarly, x4, x5, x6 and x7 all use the same Walsh code of length 2.

| | | | | | | | | | |
|---|---|---|---|---|---|---|---|---|---|
| x0 | [ | 1 | 1 | 1 | 1 | 1 | 1 | 1 | 1] |
| x1 | [ | 1 | 1 | 1 | 1 | −1 | −1 | −1 | −1] |
| x2 | [ | 1 | 1 | −1 | −1 | | | | ] |
| x3 | [ | 1 | 1 | −1 | −1 | | | | ] |
| x4 | [ | 1 | −1 | | | | | | ] |
| x5 | [ | 1 | −1 | | | | | | ] |
| x6 | [ | 1 | −1 | | | | | | ] |
| x7 | [ | 1 | −1 | | | | | | ] |

The IMFWT requires only the number of operations (or fewer) corresponding to the largest spreading factor. Thus, if spreading factors of 32 and 128 are present as in the earlier example, then the number of operations required to process 256 chips is 1792 or less. There can be fewer operations since some of the butterflies are not required in the multi-rate FWTs. For the Walsh codes with lower spreading factors, the inputs which use the same Walsh code must be in bit-reversed order of the indices as demonstrated by x4, x5, x6 and x7 in FIG. 3. This is the standard bit-reversed order which is used in most fast transforms such as the Fast Fourier Transform (FFT). The Walsh codes with lower spreading factors must also be properly scaled at the output of FIG. 4. The outputs corresponding to a spreading factor one half the maximum length must be multiplied by two and the outputs with a spreading factor one fourth the maximum length must be multiplied by four. The same pattern will be used for shorter Walsh codes. Since these factors are always powers of two, it is easy to multiply by performing left bit shifts.

DESCRIPTION OF THE PREFERRED EMBODIMENT

Figure 1:
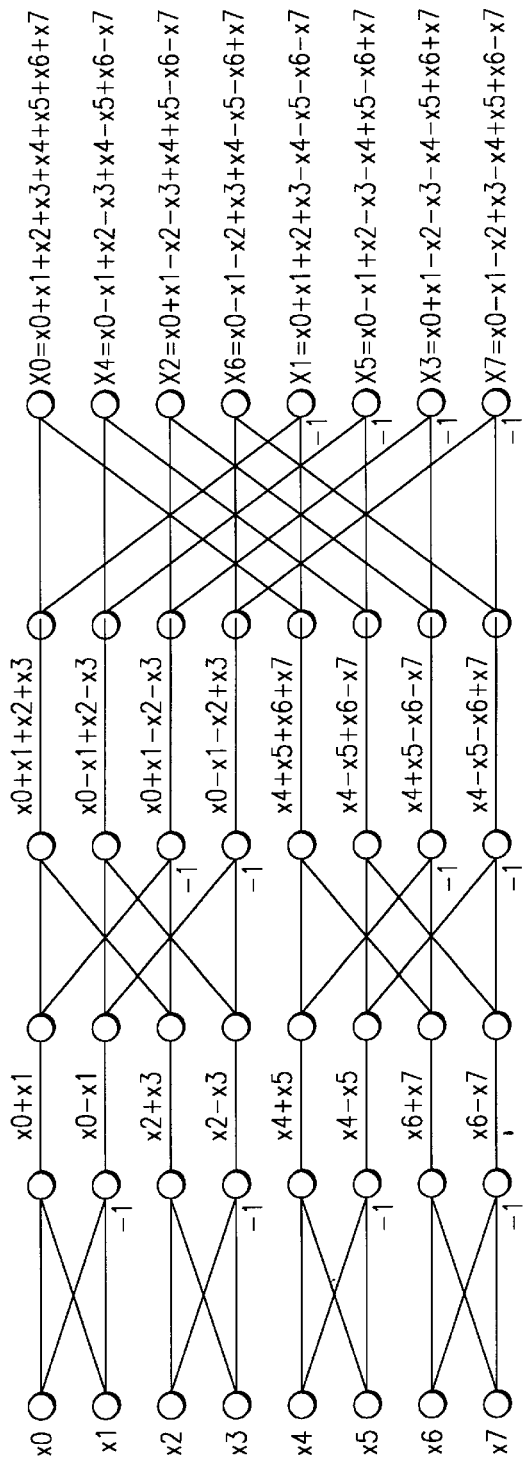
FIGS. 1 and 2 show one version of the circuit diagrams for the FWT and IFWT, respectively for Walsh codes of length 8.
Figure 2:
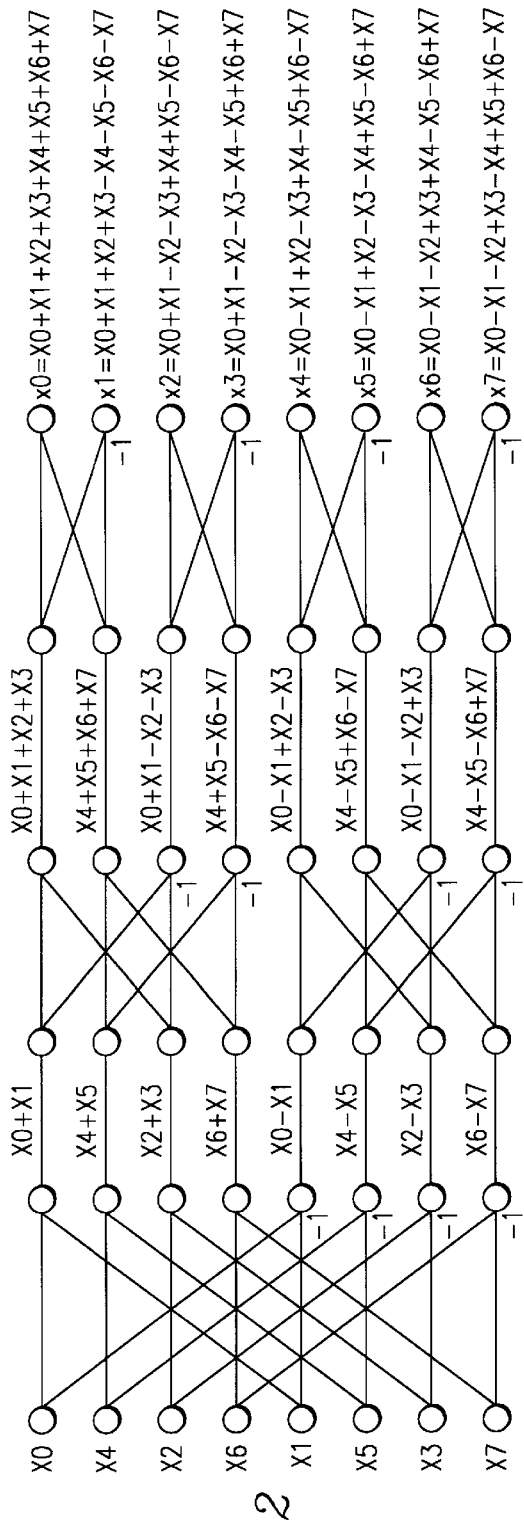
Figure 3:
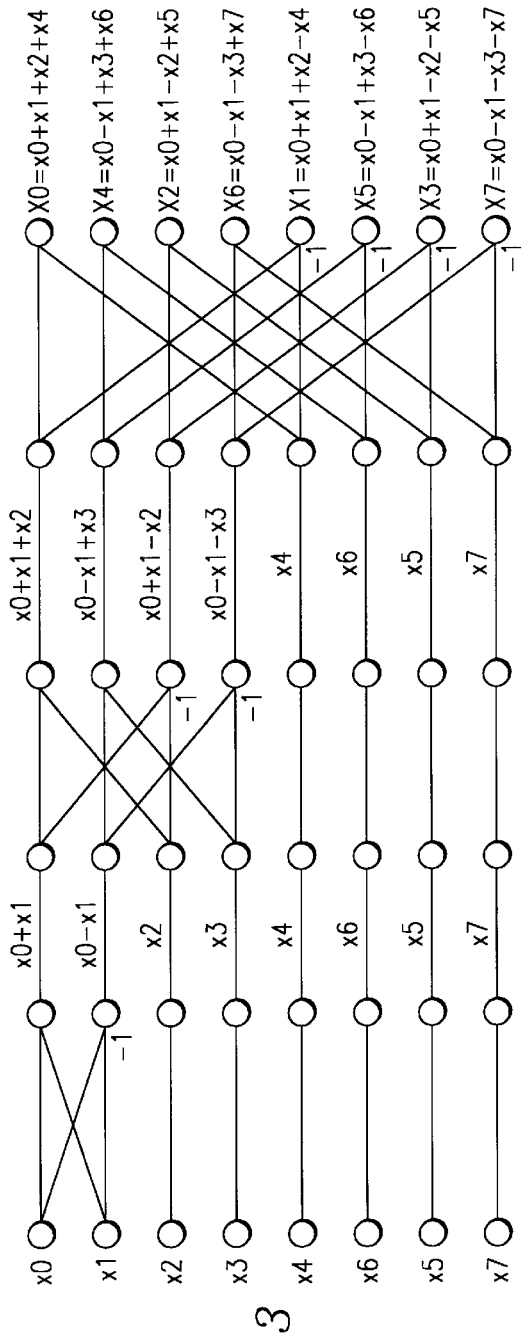
FIGS. 3 and 4 show examples of an 8-point Multi-Rate Fast Walsh Transform and an 8-point Inverse Multi-Rate Fast Walsh Transform.
Figure 4:
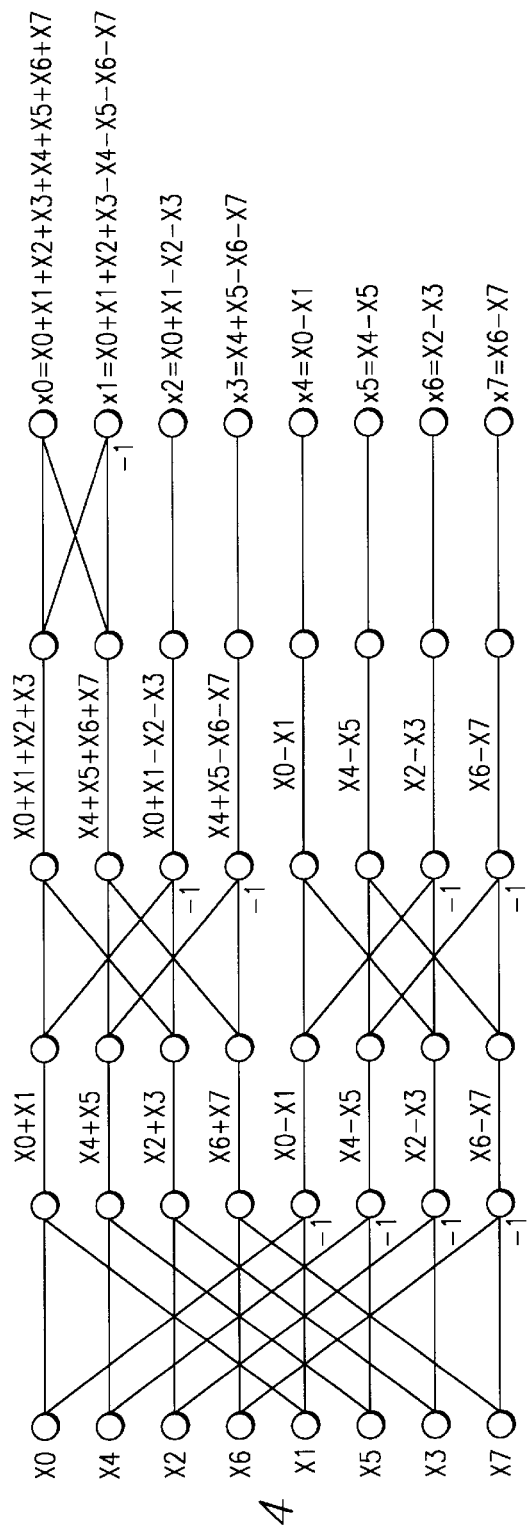
Figure 5:
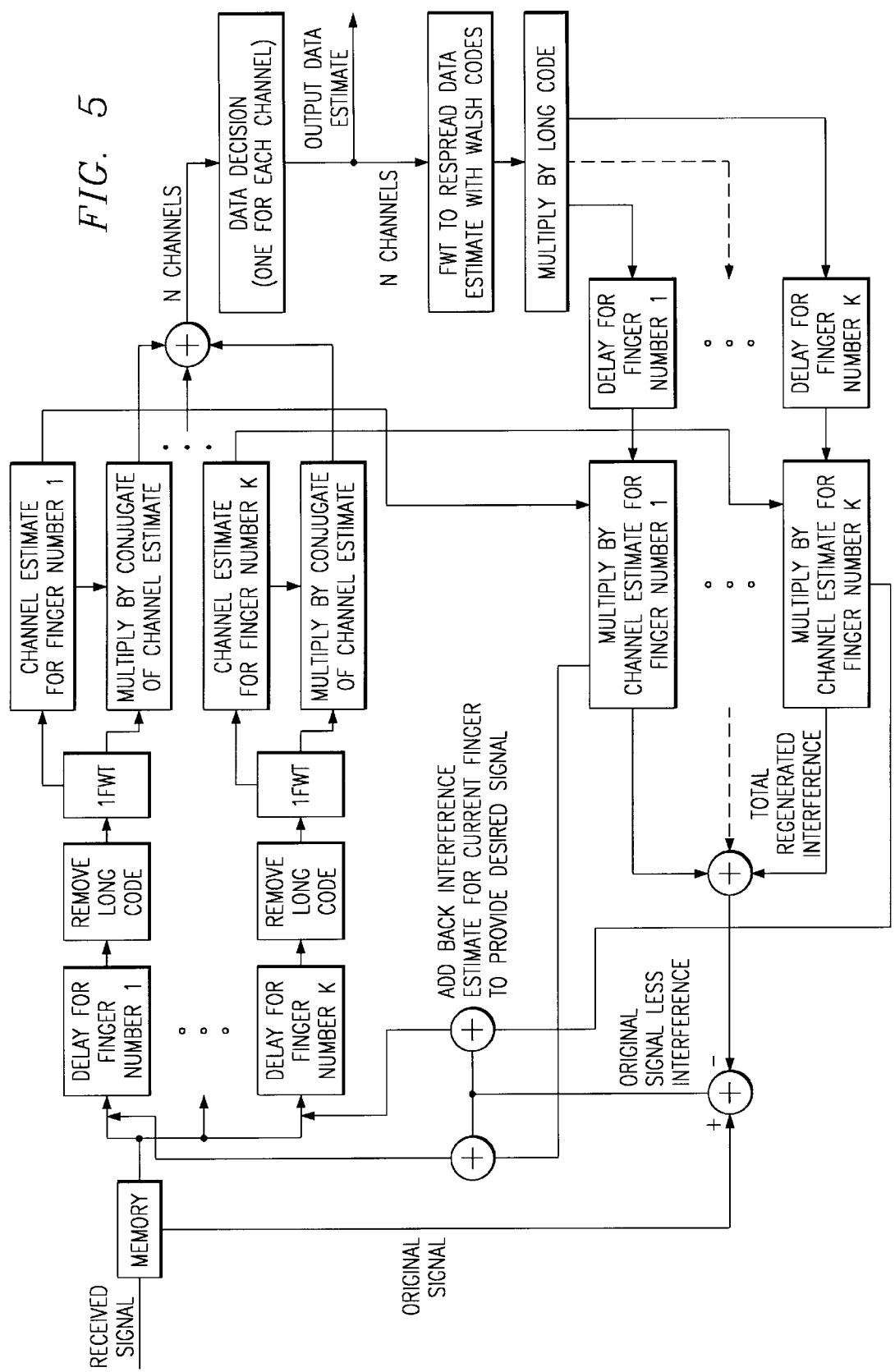
FIG. 5 is a flow diagram of a preferred embodiment of the interference cancellation circuit in accordance with the present invention.

Referring to FIG. 5, assuming operation in CDMA, the signal received from the base station at the mobile unit is stored in memory. The received signal includes the unreflected and unrefracted signal from each channel corresponding to each of the mobile units being served as well as these same signals as reflected and refracted. The signal for all of the channels have the same standard long code and the unique Walsh codes associated with each of the channels. In addition, in standard manner, the delays for reception of all maxima of concern in the received signal, which are generally the principal signal and the major reflected and/or refracted signals, are determined and the signal in memory is applied to a plurality of delay fingers. Each delay finger is part of a path having a plurality of channels, each path corresponding to a different Walsh code, the number of channels corresponding to the number of available Walsh codes being used. Each path has substantially identical elements, there being one delay finger for each maximum of interest. Maxima of interest may be those maxima above a certain amplitude, for example, though criteria other than maxima can be used. The long code is removed from each channel of each path and the signal in each channel of each path is then subjected to an inverse fast Walsh transform (IFWT) to remove the Walsh code for that channel from the signal, leaving the transmitted signal which passed through each delay minus the long code and minus the Walsh code for that channel at each IFWT output. The IFWT output of each channel of each path is then multiplied by the conjugate of the channel estimate for that path. The channel estimate compensates for any phase shift in the channel and provides the correct weighting so that maximal ratio combining can be performed. The channel estimate is a number with magnitude and phase representative of the attenuation and phase shift of the signal in the respective path which is obtained from an output of the IFWT and is obtained by averaging the pilot symbols. The outputs of all of the same channels of each path are then combined in a maximal ratio combiner which adds up the energy received from all of the paths for each of the channels individually. The output of the maximal ratio combiner is sent along plural paths, one path for each channel, to a data decision block, one data decision block for each channel estimate which symbols were transmitted by finding the closest constellation point to the received signal. The output of each data decision block is the data estimate which can be the output for the received signal or it can be recycled for additional correction.

In the case of recycling, the data from each channel is respread by applying to the output for each channel the fast Walsh transform (FWT) for that channel and then combining all of the signals. The combined signal is then multiplied by the long code and the combined signal is applied to a series of delay fingers identical to the delay fingers previously discussed, the signal along each path being delayed using the same delay in each path as previously utilized. The delayed signal in each path is then multiplied by the channel estimate for each finger, respectively, as previously to reintroduce the attenuation and phase shift previously removed. The signal outputs after channel estimate multiplication are summed in a summer to provide the total regenerated interference. The total regenerated interference is subtracted from the original signal stored in memory to provide the original received signal less the interference as determined in one pass through the interference cancellation circuit. For each path, the interference estimate for that finger is added to the signal less the interference with this sum now being the input to the delay for each finger instead of the signal being taken from memory with appropriate switching to disconnect the memory from the delay for fingers #1 to #k. This interference cancellation can be recycled one or more times, as desired, to continually cancel more interference with each recycling.

The circuits required for performing each of the above functions are well known and are described, for example, in Viterbi, A. J., CDMA: Principles of Spread Spectrum Communication, Addison-Wesley, Reading, Mass. (1995), the contents of which are incorporated herein by reference.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A station capable of receiving information containing Walsh coding for a plurality of channels and canceling interference from the received information comprising:
    (a) a memory for storing received signals containing a Walsh code for each of a plurality of channels as well as reflected and/or refracted versions of said received signals;
    (b) a first plurality of signal paths selectively coupled to said memory, each said signal path coupled to said memory for receiving said signals stored in said memory, each said signal path including:
        (i) a first delay circuit corresponding to a different one of a plurality of time spaced apart conditions of said received signal;
        (ii) an inverse fast Walsh transform circuit coupled to said delay circuit for removing the Walsh code corresponding to that path from said received signal;
        (iii) estimation circuitry for providing an estimate for each path of phase shift and attenuation of said received signal in that path, said estimation circuitry coupled to said first delay circuit;
        (iv) multiplication circuitry for multiplying the conjugate of said estimate with said signal after removal of said Walsh code in each said path to provide a path output for each said channel, said multiplication circuitry coupled to said transform circuit; and
        (v) a combiner coupled to said multiplication circuitry for combining the path outputs of each of said channels to provide a data estimate.

2. The station of claim 1 wherein said station is a mobile station.

3. The station of claim 1 wherein said spaced apart condition is predetermined maxima in said received signal.

4. The station of claim 2 wherein said spaced apart condition is predetermined maxima in said received signal.

5. The station of claim 1 further including circuitry for applying the Walsh code corresponding to each said channel to said data estimate for said channel to provide a second plurality of signal paths corresponding to and coupled to said first plurality of signal paths, each of said second plurality of signal paths including:
   (i) a second delay circuit corresponding to a different one of said plurality of time spaced apart conditions of said received signal for delaying said data estimate with Walsh codes;
   (ii) circuitry for providing said estimate for each path of phase shift and attenuation of said received signal in that path, said circuitry coupled to said second delay circuit;
   cancellation circuitry for determining and subtracting the total regenerated interference from said received signals said cancellation circuitry coupled to said circuitry for providing; and
   circuitry for applying to said first delay circuit on a path by path basis said received signal minus said total regenerated interference plus said estimated interference to the exclusion of said received signal.

6. The station of claim 5 wherein said station is a mobile station.

7. The station of claim 5 wherein said spaced apart condition is predetermined maxima in said received signal.

8. The station of claim 6 wherein said spaced apart condition is predetermined maxima in said received signal.

9. A method of canceling interference from received information at a station capable of receiving information containing Walsh coding for a plurality of channels comprising the steps of,
   (a) storing received signals containing a Walsh code for each of a plurality of channels as well as reflected and/or refracted versions of said received signals;
   (b) applying a first plurality of signal processing paths to said received signals stored in step (a);
   (c) in each of said signal processing paths:
      (i) delaying said received signal in accordance with a different one of a plurality of time spaced apart conditions of said received signal;
      (ii) applying to said received signal for each said channel an inverse fast Walsh transform corresponding to that channel for removing the Walsh code corresponding to that channel from said received signal;
      (iii) providing an estimate for each processing path of phase shift and attenuation of said received signal in that processing path;
      (iv) multiplying the conjugate of said estimate with said signal for each channel in each processing path after removal of said Walsh code in each said processing path to provide a processing path output for each said channel; and
      (v) combining the proceeding path outputs of each of said channels to provide a data estimate.

10. The method of claim 9 wherein said station is a mobile station.

11. The method of claim 9 wherein said spaced apart condition is predetermined maxima in said received signal.

12. The method of claim 10 wherein said spaced apart condition is predetermined maxima in said received signal.

13. The method of claim 9 further including applying the Walsh code corresponding to each said channel to said data estimate for said channel to provide a second plurality of signal processing paths corresponding to said first plurality of signal processing paths, each of said second plurality of signal processing paths including:
   (i) delaying said data estimate with applied Walsh code with a delay corresponding to a different one of said plurality of time spaced apart conditions of said received signal;
   (ii) providing said estimate for each path of phase shift and attenuation of said received signal in that processing path;
   (iii) determining and subtracting the total regenerated interference from said received signals; and
   (iv) applying to said first delay circuit on a processing path by processing path basis said received signal minus said total regenerated interference plus said estimated interference to the exclusion of said received signal.

14. The method of claim 13 wherein said station is a mobile station.

15. The method of claim 13 wherein said spaced apart condition is predetermined maxima in said received signal.

16. The method of claim 14 wherein said spaced apart condition is predetermined maxima in said received signal.

* * * * *